No. 803,812. PATENTED NOV. 7, 1905.
W. A. DAVIDSON.
CHUCK FOR GRINDING JOINT RINGS.
APPLICATION FILED OCT. 8, 1904.
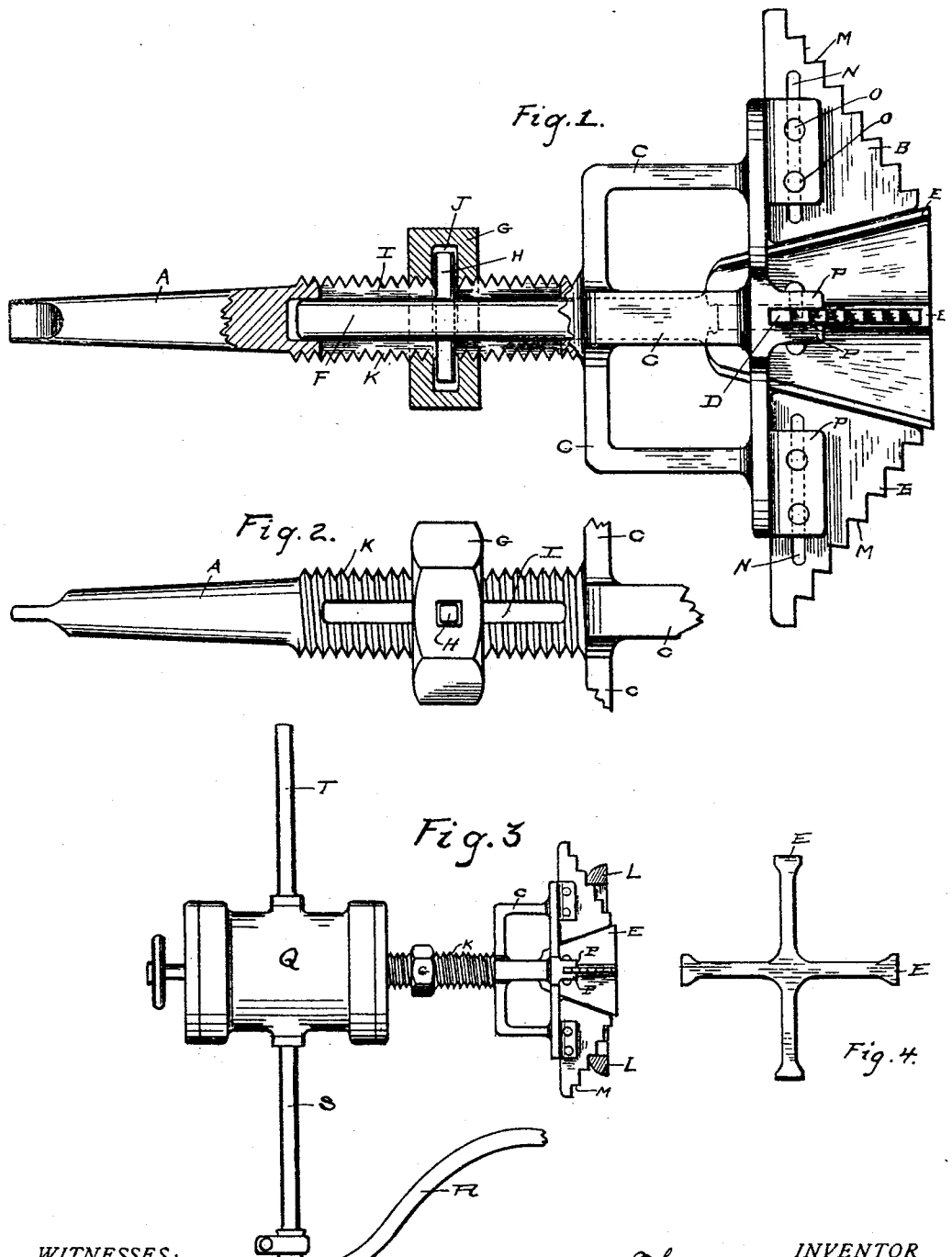

UNITED STATES PATENT OFFICE.

WILLIAM A. DAVIDSON, OF MILWAUKEE, WISCONSIN.

CHUCK FOR GRINDING JOINT-RINGS.

No. 803,812. Specification of Letters Patent. Patented Nov. 7, 1905.

Application filed October 8, 1904. Serial No. 227,747.

*To all whom it may concern:*

Be it known that I, WILLIAM A. DAVIDSON, a citizen of the United States, residing at Milwaukee, county of Milwaukee, and State of Wisconsin, have invented new and useful Improvements in Chucks for Grinding Joint-Rings, of which the following is a specification.

My invention relates to improvements in that class of ring-chucks which is adapted to be operated by pneumatic motors.

My chuck is adapted to be used for holding joint-rings in connection with the opposing ends of steam and other pipes while forming a so-called "ground joint" between such parts.

The object of my improvement is to provide a chuck of simple construction by which the ring may be firmly clamped and rigidly held by the operator as the same is held against the opposing surfaces to be ground, whereby a given amount of work may not only be quickly but perfectly done and the liability of the ring becoming accidentally detached from the chuck while being ground is avoided.

The construction of my invention is explained by reference to the accompanying drawings, in which—

Figure 1 represents a side view thereof, part in section. Fig. 2 represents a side view of the shank as it appears from the upper side of Fig. 1. Fig. 3 represents a side view of the chuck in connection with a pneumatic motor by which it is operated. Fig. 4 represents an end view of the diagonal bearings by which the clamping-plates are adjusted.

Like parts are identified by the same reference-letters throughout the several views.

My chuck comprises, among other things, the operating-shank A, a plurality of radial clamping-jaws B, jaw-supporting brackets C, formed integrally with the shank A and each provided with a radial recess D for the reception of the radial clamping-jaws B, diagonal jaw-actuating bearings E, central shank F, having slidable bearings within the operating-shank A, operating-nut G, and radial pin H. The pin H is rigidly affixed at its center to the central shank F, and extends from thence outwardly through the longitudinal slot I and has slidable bearings at its respective ends in the annular groove J, formed within the nut G. Thus it will be understood that as the nut G is turned forwardly or backwardly upon the thread K of the shank the pin H and the interior shank F will be carried forwardly and backwardly with it, whereby the diagonal jaw-actuating bearings E, which are formed integrally with said shank F, are adjusted relatively to the radial clamping-jaws B. Thus it will be obvious that when the joint-ring L is placed upon the several corresponding steps M of the jaws B and said nut C is turned backwardly or toward the left upon its supporting-shank said jaws B will be forced outwardly by contact of said diagonal bearings, and said clamping jaws thereby caused to impinge against the bearing-surface of the joint-ring, whereby the latter will be securely clamped and held in place upon the chuck. When, however, it is desirous to remove the joint-rings from the chuck, the nut G is turned forwardly or in the opposite direction, whereby the clamping-jaws are relieved from the outward pressure of the diagonal bearings and said joint-ring is released. The several clamping-jaws B are provided with slots N for the reception of the retaining-pins O O. The pins O are supported at their respective ends in the radial bearings P P, while their central portions pass through the slots N of the clamping-jaws and serve to hold said clamping-jaws slidably in place.

I have provided the several clamping-jaws B with a plurality of series of steps M, corresponding substantially with the diameters of the several sizes of rings with which the chuck is adapted to be used, whereby when a ring is placed upon the annular series of steps which most nearly fit the same it becomes necessary to move the clamping-jaws but a slight distance farther in order to securely hold the ring in place thereon.

While I have shown a plurality of radial bearings E for operating the several clamping-jaws B, it is obvious that a conical-shaped block or bearing-surface may be substituted for said bearing-arms without departing from the essence or spirit of my invention. The arms shown, however, contain less material and are preferable. Q represents a pneumatic motor of ordinary construction with which my chuck is adapted to be used. Air under pressure is led to the motor through the flexible tube R and rigid tube S. The tube S and the arm I serve as handles by which the motor may be operated.

The free end of the shank A is connected with the motor in the ordinary way.

Having thus described my invention, what I claim as new, and desire to secure by Letters Patent, is—

1. In a ring-chuck, the combination of an operating-shank; provided with a screw-threaded surface; and a longitudinal slot; a nut operating on said screw-threaded surface; a plurality of jaw-supporting brackets rigidly supported from said shank; a plurality of radial clamping-jaws slidably supported from said brackets and having inwardly-converging bearing ends; a central shank slidably supported within said operating-shank and provided with diverging bearings adapted to contact with the inwardly-converging bearing ends of said clamping-jaws; a radial pin rigidly affixed at its center to said central shank and having its respective ends protruding therefrom through the longitudinal slot of said shank and adapted to engage within the annular recess of said nut, whereby as said nut is turned forwardly, said clamping-jaws are relieved from contact with said diverging bearings, and whereby as said nut is turned in the opposite direction, said diverging bearings are brought into operative contact with said clamping-jaws and the latter are forced outwardly into clamping engagement with the joint-rings to be operated upon, substantially as specified.

2. In a ring-chuck, the combination of an operating-shank; provided with a screw-threaded surface; and a longitudinal slot; a nut operating on said screw-threaded surface; a plurality of jaw-supporting brackets rigidly supported from said shank; a plurality of radial clamping-jaws slidably supported from said brackets and having inwardly-converging bearing ends; a central shank slidably supported within said operating-shank and provided with diverging bearings adapted to contact with the inwardly-converging bearing ends of said clamping-jaws; a radial pin rigidly affixed at its center to said central shank and having its respective ends protruding therefrom through the longitudinal slot of said shank and adapted to engage within the annular recess of said nut, whereby as said nut is turned forwardly, said clamping-jaws are relieved from contact with said diverging bearings, and whereby as said nut is turned in the opposite direction, said diverging bearings are brought into operative contact with said clamping-jaws and the latter are forced outwardly into clamping engagement with the joint-rings to be operated upon, substantially as specified.

In testimony whereof I affix my signature in the presence of two witnesses.

WILLIAM A. DAVIDSON.

Witnesses:
  JAS. B. ERWIN,
  LEVERETT C. WHEELER.